United States Patent [19]

Brown et al.

[11] Patent Number: 4,887,708
[45] Date of Patent: Dec. 19, 1989

[54] DRIVE APPARATUS FOR BELT POWER TURNS

[75] Inventors: Robert D. Brown, Canon City; Richard A. Compton, Pueblo, both of Colo.

[73] Assignee: Portec, Inc., Oak Brook, Ill.

[21] Appl. No.: 300,135

[22] Filed: Jan. 23, 1989

[51] Int. Cl.[4] .............................................. B65G 15/02
[52] U.S. Cl. .................................... 198/831; 198/834; 198/835; 198/842
[58] Field of Search ............... 198/831, 833, 834, 835, 198/838, 839, 840, 842

[56] References Cited

U.S. PATENT DOCUMENTS

| | | | |
|---|---|---|---|
| 3,044,603 | 7/1962 | Fry | 198/831 |
| 3,100,565 | 8/1963 | Fry | 198/831 X |
| 3,217,861 | 11/1965 | Daniluk et al. | |
| 3,237,754 | 4/1960 | Freitag, Jr. et al. | |
| 3,358,811 | 12/1967 | Gerrish | |
| 3,851,256 | 4/1976 | Gurewitz | |
| 4,196,804 | 4/1980 | Hecketsweiler et al. | |
| 4,202,443 | 5/1980 | Bührer | |

FOREIGN PATENT DOCUMENTS 3421413 12/1985 Fed. Rep. of Germany ...... 198/831

OTHER PUBLICATIONS

"Sparks/Curveyor", Sparks Belting Conveyor Pamphlet 1/1988.
Portec Brochure, 1983.
Pp. 4-6 from Knife-Edge Owner's Manual.

*Primary Examiner*—Robert J. Spar
*Assistant Examiner*—D. Glenn Dayoan
*Attorney, Agent, or Firm*—Klaas & Law

[57] ABSTRACT

Drive apparatus for driving an endless moving conveyor belt for a power turn to change the direction of movement of articles in a transfer conveying system wherein the plurality of rolls at each end of the power turn over which the endless conveyor belt passes have a diameter less than about one inch. An endless chain is attached to the endless moving conveyor belt for movement therewith. A drive shaft is provided adjacent to each end of the power turn and has a drive roll having a tapered outer surface and a drive sprocket mounted thereon for rotation therewith. A snub roll shaft is provided adjacent to each end of the power turn and has a snub roll integral with the snub roll drive shaft and having a tapered outer surface and a snub roll sprocket mounted on the drive roll snub shaft for rotation therewith. An idler sprocket is mounted on the outer side wall adjacent to each end of the power turn. The endless moving conveyor belt is trained around the power turn so that at one end portion it moves first over the outer surfaces of the plurality of rolls, then over a portion of the lower half of a drive roll's outer surface and then over a portion of the upper half of the snub roll's outer surface to provide a frictional driving force. At the other end portion, the movement is in a reverse order. The endless chain is trained around the power turn so that at one end it moves first over the idler sprocket, then over a portion of the lower half of the drive sprocket and then over a portion of the upper half of the snub roll sprocket to provide a positive driving force. At the other end, the movement is in a reverse order.

20 Claims, 5 Drawing Sheets

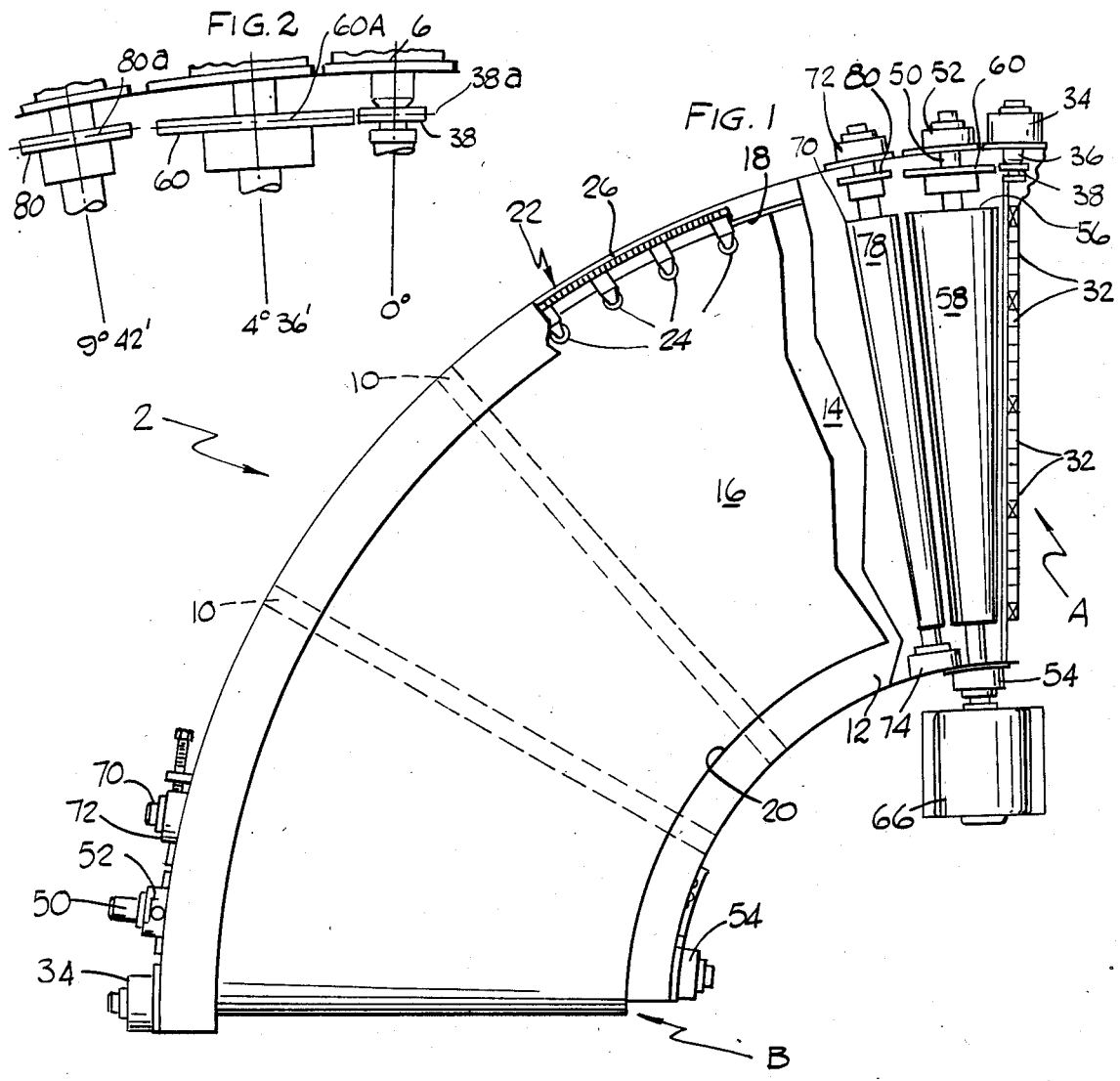
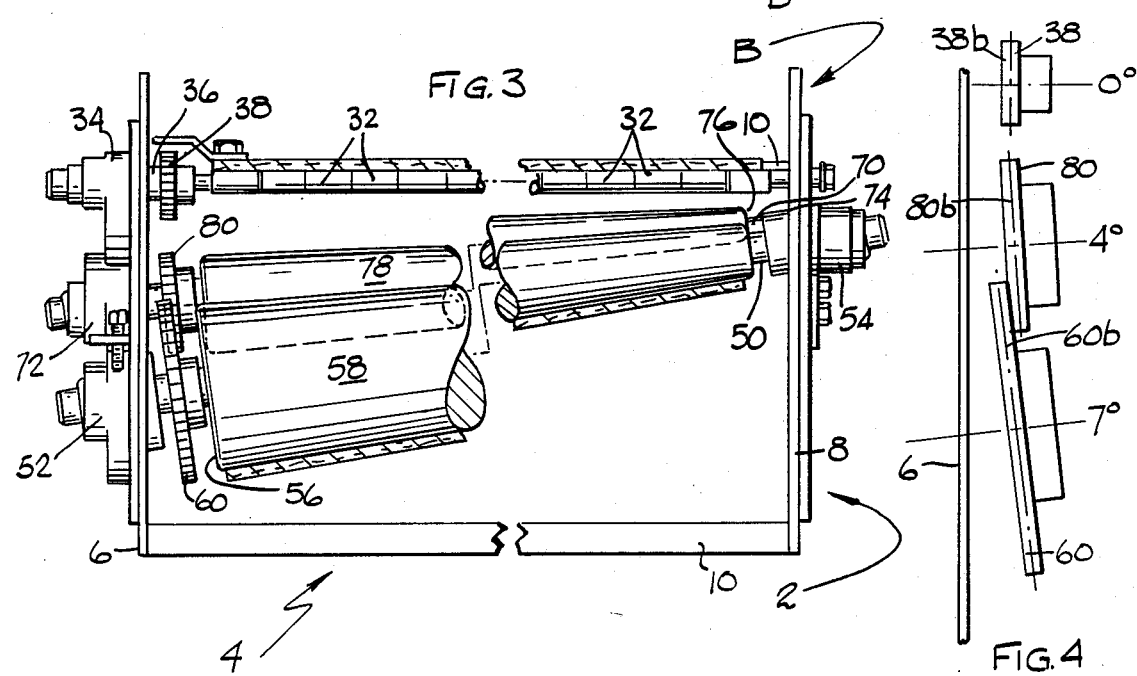

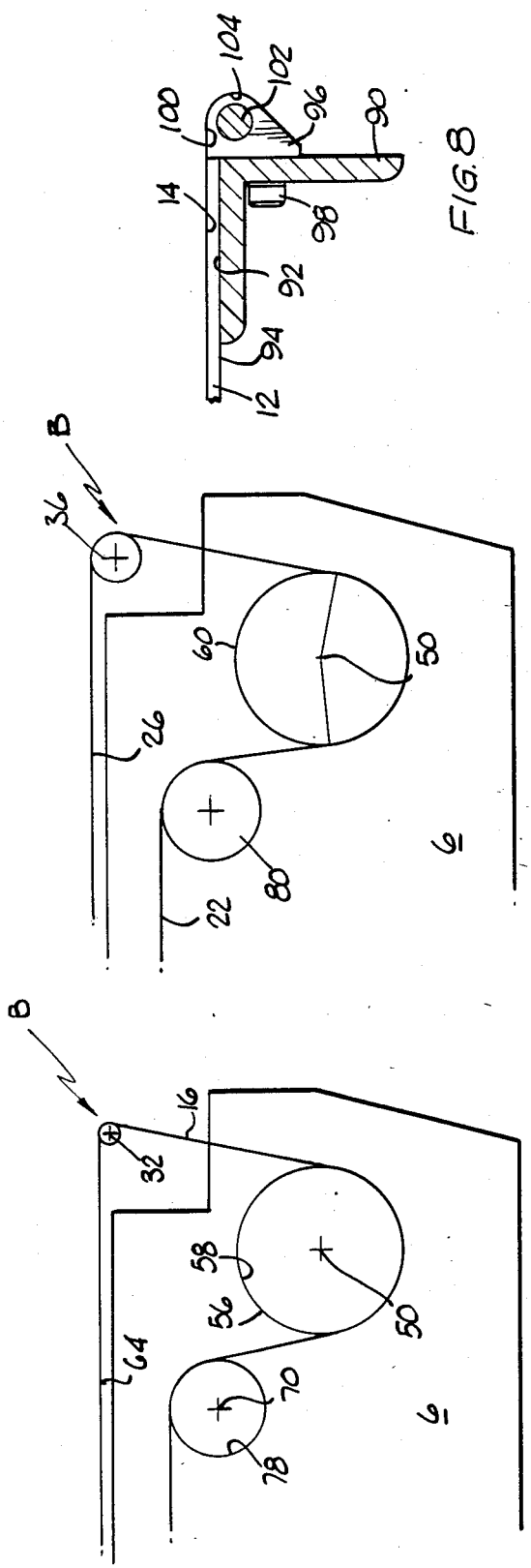
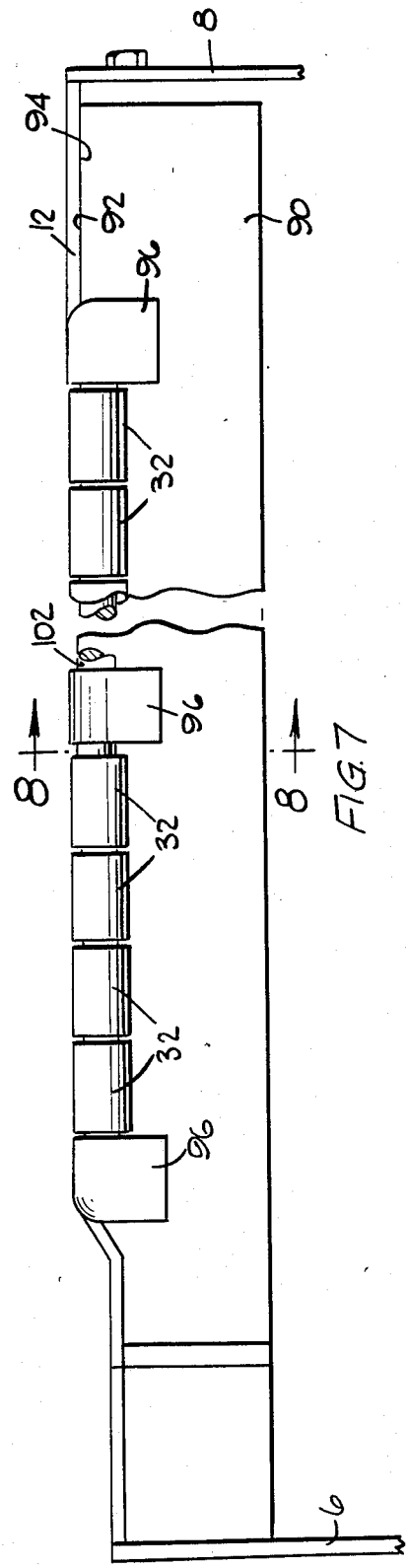

DRIVE APPARATUS FOR BELT POWER TURNS

FIELD OF THE INVENTION

This invention is directed generally to power turns used to change the direction of movement of articles being moved from one location to another location on conveying systems and more particularly to drive apparatus for moving the conveyor belt of a power turn.

BACKGROUND OF THE INVENTION

In power turns for changing the direction of movement in a conveying system for conveying relatively small light-weight articles, it is necessary that the end of the turn where the article is transferred from the power turn to the next conveyor belt be as sharp as possible. Accordingly, this is accomplished by rotatably mounting a plurality of relatively small diameter rolls, such as about 0.625 inch, on an axis and have the conveyor belt pass over such rolls so that the included angle between the portions of the conveyor belt before and after the rolls is in the range of about 75 to 80 degrees. A system of this nature is illustrated on pages 4–6 from an Owner's Manual published by Portec Inc. and which is prior art to this invention. In this power turn, the conveyor belt passes over the outer peripheral tapered surface of a drive roll and a straight continuous surface snub roll is used to place a desired tension on the conveyor belt so that sufficient frictional forces are present for the drive roll to drive the conveyor belt. A belt guide assembly is provided and comprises a plurality of rollers attached to the outer portion of the conveyor belt and are held in position by rolling contact with a stationary guide. While this arrangement is satisfactory for power turns of 90 degrees or less and conveyor belt widths of 30 inches or less, some difficulties have been encountered for power turns of this nature of at least 90 degrees and greater and conveyor belt widths of at least 30 inches and greater.

BRIEF DESCRIPTION OF THE INVENTION

This invention provides a positive driving means for cooperation with frictional driving means so that power turns of the above-described nature may perform well at an angle of at least 90 degrees and greater and with conveyor belt widths of at least 30 inches and greater.

In the preferred embodiment of the invention, a power turn is provided which comprises a frame having outer and inner side walls and support means for holding the outer and inner side walls in spaced apart relationship and an endless conveyor belt having outer and inner peripheral edges wherein the radius of the outer peripheral edge is substantially greater than the radius of the inner peripheral edge. The upper run of the conveyor belt is supported on a slider bed so that the upper run will have a generally planar exposed surface. An endless link chain is secured to an outer portion of the conveyor belt and extends outwardly therefrom. The upper run of the endless link chain is located in a stationary guide having wear surfaces secured thereto. The slider bed is secured in the frame by conventional constructions. At each end portion of the power turn, there are mounted a plurality of relatively small diameter rolls which are rotatably mounted on a fixed shaft secured to the frame and having a longitudinal axis. The endless conveyor belt passes over these relatively small diameter rolls and the greatest arcuate extent of the power turn is between the plurality of rolls at each end. Also mounted on the frame at each end of the power turn is a bearing in which a shaft is rotatably mounted and which bearing has a longitudinal axis which is substantially parallel to the longitudinal axis of the shaft on which the plurality of rolls are rotatably mounted. An idler sprocket having a plurality of teeth is mounted on the shaft for rotation therewith and is located so that the teeth thereof are contacted by the endless link chain. A drive shaft is located adjacent to each end portion of the power turn and is rotatably mounted in an outer bearing adjustably mounted on the frame and in an inner bearing adjustably mounted on the frame. A drive roll having a tapered outer peripheral surface is mounted on each drive shaft for rotation therewith and the endless conveyor belt passes over a portion of the tapered outer surface and is in frictional engagement therewith. A drive sprocket having teeth is secured to the drive shaft for rotation therewith and is located so that the teeth thereof move into engagement with the endless link chain so as to drive the endless link chain and the endless conveyor belt. The drive shaft is located below the upper run of the endless conveyor belt and arcuately inwardly from the ends of the power turn. A snub roll shaft is located adjacent to each end portion of the power turn and is rotatably mounted in an outer bearing adjustably mounted on the frame and in an inner bearing adjustably mounted on the frame. A snub roll having a central body portion having a tapered outer surface is integral with each snub roll shaft and the endless conveyor belt passes over a portion of the tapered outer surface of the snub roll. The adjustability of the snub roll provides for controlling the frictional forces between the drive roll and the endless conveyor belt. An idler sprocket having teeth is mounted on the snub roll shaft for rotation therewith and is located so that the teeth thereof are engaged by the endless link chain and rotated thereby. The snub roll shafts are located in a plane between the upper run of the endless conveyor belt and the plane of the drive shafts and are spaced arcuately inwardly from the drive shafts. The lower run of the endless link chain is located in a stationary guide having wear surfaces secured thereto. The drive rolls are positioned relative to the plurality of rolls so that vertical tangent planes to the outer peripheral surfaces thereof lie in spaced apart vertical planes that are in a substantially parallel relationship and the snub rolls are positioned relative to the drive rolls so that vertical tangent planes to the outer peripheral surfaces thereof lie in spaced apart vertical planes that are in a substantially parallel relationship. The endless moving conveyor belt is trained around the power turn so that at one end portion it moves first over the outer surfaces of the plurality of the rolls, then over a portion of the lower half of a drive roll's outer surface and then over a portion of the upper half of the snub roll's outer surface. At the other end portion, the movement is in a reverse order. The endless chain is trained around the power turn so that at one end it moves first over the idler sprocket, then over a portion of the lower half of the drive sprocket and then over a portion of the upper half of the snub roll sprocket. Thus, there is provided driving apparatus that has a frictional driving force between the endless moving conveyor belt and the outer surface of the drive roll and a positive driving force between the endless chain and the drive sprocket.

BRIEF DESCRIPTION OF THE DRAWINGS

An illustrative and presently preferred embodiment of the invention is shown in the accompanying drawings in which:

FIG. 1 is a top plan view of the preferred embodiment of this invention;

FIG. 2 is an enlarged schematic top plan view of a portion of FIG. 1;

FIG. 3 is an end elevational view of FIG. 1 with a portion of the endless conveyor belt omitted.

FIG. 4 is an enlarged schematic end elevation view of a portion of FIG. 3;

FIG. 5 is a schematic illustration showing the location of various components;

FIG. 6 is a schematic illustration showing the location of various components;

FIG. 7 is an elevational view of the plurality of rolls at one end of the power turn;

FIG. 8 is a cross-sectional view taken on the line 8—8 of FIG. 7;

DETAILED DESCRIPTION OF THE INVENTION

Figure 9:
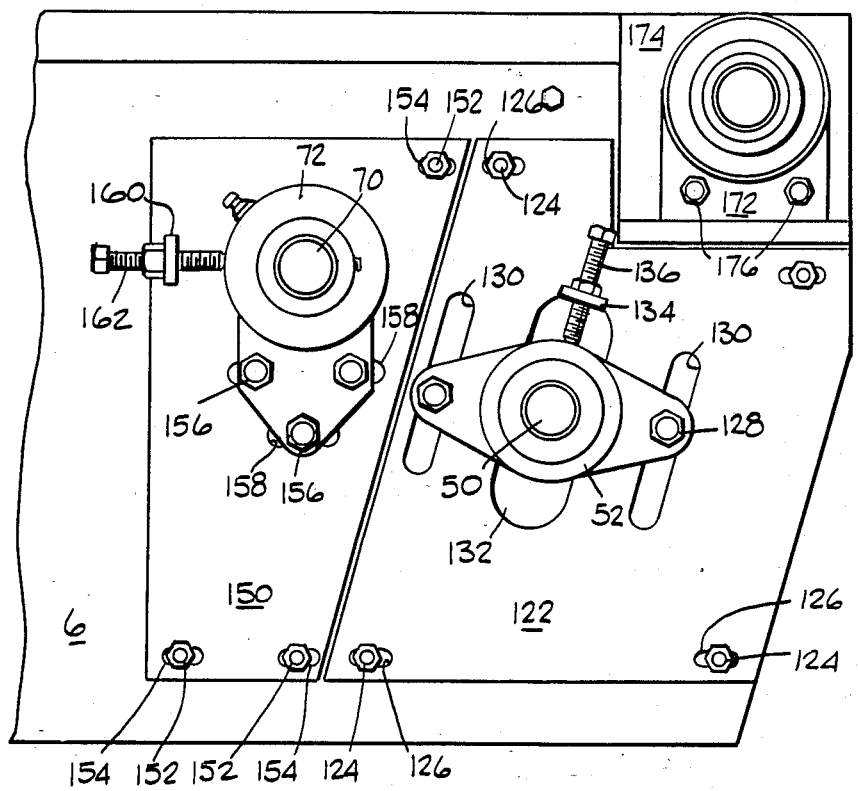
FIG. 9 is a front elevational view of the mounting of components on the outer side wall.

In FIGS. 1 and 3, there is illustrated a power turn 2 of this invention which is supported on conventional support legs (not shown). The power turn illustrated in FIG. 1 is only a power turn of 90 degrees, but this is for illustration purposes and this invention, as stated above, is for power turns of at least 90 degrees and greater and conveyor belt widths of at least 30 inches and greater. The power turn 2 has a frame 4 comprising an outer side wall 6 and an inner side wall 8. A plurality of upper and lower L-shaped support bars 10 extend between and are secured to the inner surfaces of the outer and inner side walls 6 and 8 to provide supports therefor. A slide bed 12 is secured to the outer and inner side walls 6 and 8 and has a continuous smooth and generally planar surface 14. An endless conveyor belt 16 is mounted so that the upper run thereof is in sliding-contact with the generally planar surface 14 and has an outer peripheral edge 18 and an inner peripheral edge 20 and, as illustrated in FIG. 1, the radius of the outer peripheral edge 18 is substantially greater than the radius of the inner peripheral edge 20. An endless link chain 22 is secured to a portion of the endless conveyor belt 16 adjacent to the outer peripheral edge 18 by a plurality of conventional securing means 24. The upper run 26 of the endless link chain 22 is located in a stationary guide 28, FIG. 17, having wear surfaces 30 secured thereto. At each end portion A and B of the power turn 2, there are mounted a plurality of relatively small diameter rolls 32 which are rotatably mounted on a fixed shaft, described more fully below. The endless conveyor belt 16 passes over these plurality of rolls 32 and defines the greatest arcuate extent of the power turn. A bearing 34 is mounted on the outer side wall 6 adjacent to each end portion A and B of the power turn 2. A shaft 36 is mounted in the bearing 34 so that it is free to rotate and has a sprocket 38 mounted thereon for rotation therewith. Each sprocket has a plurality of teeth 40, FIG. 15, which sprocket 38 is located so that the teeth 40 are contacted by the endless link chain 22 so as to guide the endless link chain 22 around each end of the power turn 2.

Figure 14:
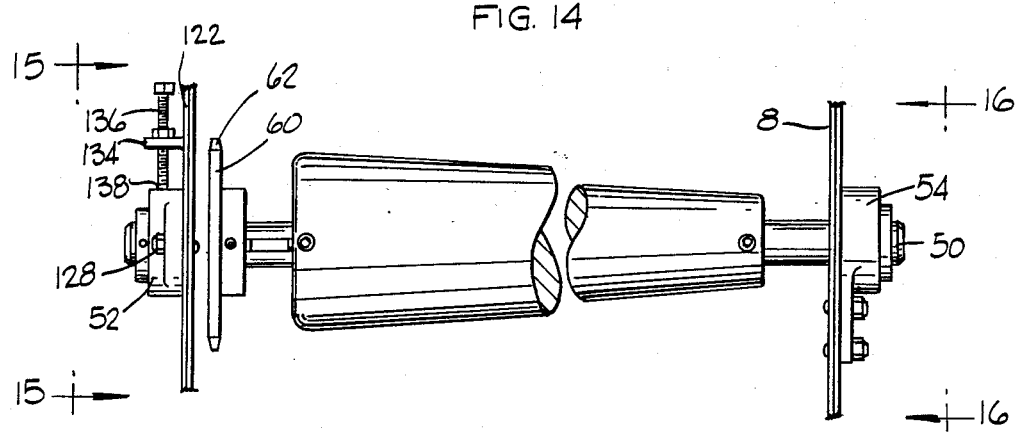
FIG. 14 is an elevational view of the drive roll assembly.

A drive shaft 50 is located adjacent each end portion A and B and is rotatably mounted in an outer bearing 52 adjustably mounted on the outer side wall 6 and in an inner bearing 54 adjustably mounted on the inner side wall 8. A drive roll 56 having a tapered outer peripheral surface 58 is mounted on the drive shaft 50 for rotation therewith and, as illustrated in FIG. 3, the endless conveyor belt 16 passes over a portion of the tapered outer surface 58 and is in frictional engagement therewith, described more fully below. A drive sprocket 60 is mounted on the drive shaft 50 for rotation therewith. The drive sprocket 60 has a plurality of teeth 62, FIG. 14, and is located so that the teeth 62 move into contact with the endless link chain 22 so as to drive the endless link chain 22 and the endless conveyor belt 16. As illustrated in FIGS. 1 and 3, the drive shaft 50 is located below the upper run 14 of the endless conveyor belt 16 and arcuately inwardly from the plurality of rolls 32 and the sprockets 36. Drive means 66 are provided for rotating at least one of the drive shafts 50.

Figure 11:
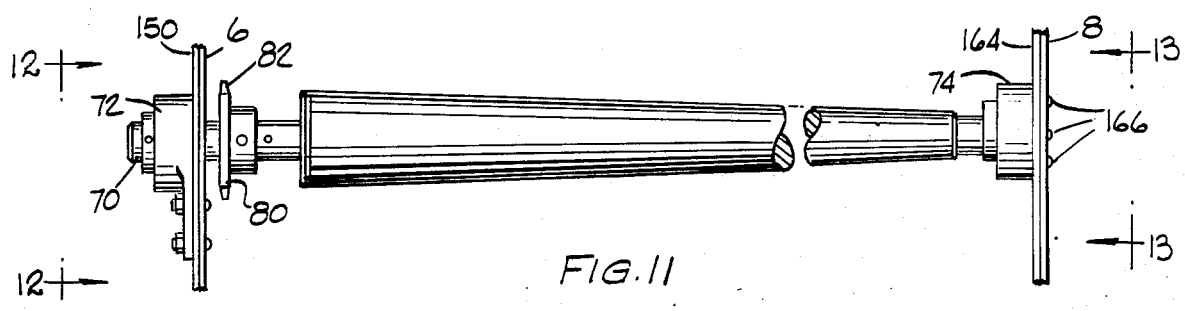
FIG. 11 is an elevational view of the snub roll assembly.
Figure 12:
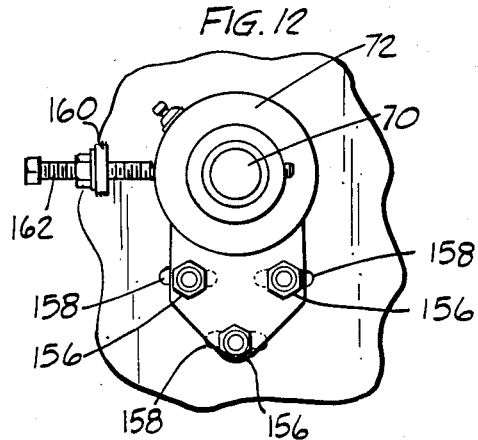
FIG. 12 is a partial side elevational view looking from the line 12—12 of FIG. 11.
Figure 13:
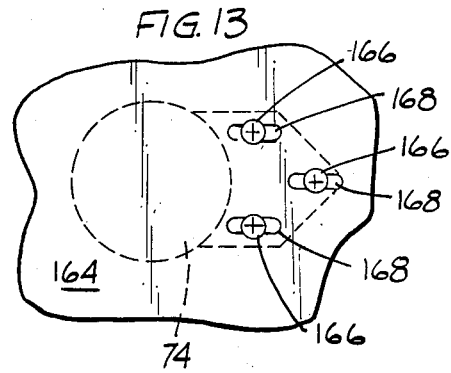
FIG. 13 is a partial side elevational view looking from the line 13—13 of FIG. 11.

A snub roll shaft 70 is located adjacent each end portion A and B and is rotatably mounted in an outer bearing 72 adjustably mounted on the outer side wall 6 and in an inner bearing 74 adjustably mounted on the inner side wall 8. A snub roll 76 having a tapered outer peripheral surface 78 is integral with each snub roll shaft 70 and rotates therewith and, as illustrated in FIG. 5, the endless conveyor belt 14 passes over a portion of the tapered outer surface 78. As explained more fully below, the adjustability of the snub roll 76 provides means for controlling the frictional forces between the tapered outer peripheral surface 58 and the endless conveyor belt 14. A snub roll sprocket 80 is mounted on the snub roll shaft 70 for rotation therewith. The snub roll sprocket 80 has a plurality of teeth 82, FIG. 11, and is located so that the endless link chain 22 moves into contact with the snub roll sprocket 80 so as to rotate the snub roll shaft 70. As illustrated in FIGS. 1 and 3, the snub roll shafts 70 are located in a plane between the upper run 14 and the plane of the drive shafts 50 and are spaced arcuately inwardly from the drive shafts 50. As illustrated in FIG. 1, vertical tangents to the outer peripheral surfaces 58 of the drive rolls 56 and the outer peripheral surfaces of the rolls 32 lie in spaced apart vertical planes that are in a parallel relationship. Also, vertical tangents to the outer peripheral surfaces 58 and 78 lie in spaced apart vertical planes that are in a parallel relationship.

The mounting of the relatively small diameter rolls 32, which have a diameter less than about one inch and preferably a diameter of 0.625 inch, is illustrated in FIGS. 7 and 8. An L-shaped support bar 90 extends between and is secured to the outer and inner side walls 6 and 8 and has an upper surface 92 in contact with a portion of the bottom surface 94 of the slide bed 12. A plurality of support blocks 96 are secured to the support bar 90 by suitable means, such as threaded bolts 98, so that the upper planar surfaces 100 thereof are coplanar with the smooth planar surface 14 of the slider bed 12. A fixed shaft 102 is mounted in the support blocks 96 and has a central longitudinal axis. The rolls 32 are rotatably mounted on the fixed shaft 102. The support blocks 96 have an arcuate surface 104 that has a radius of curvature that is the same as the radius of each of the rolls 32.

Figure 10:
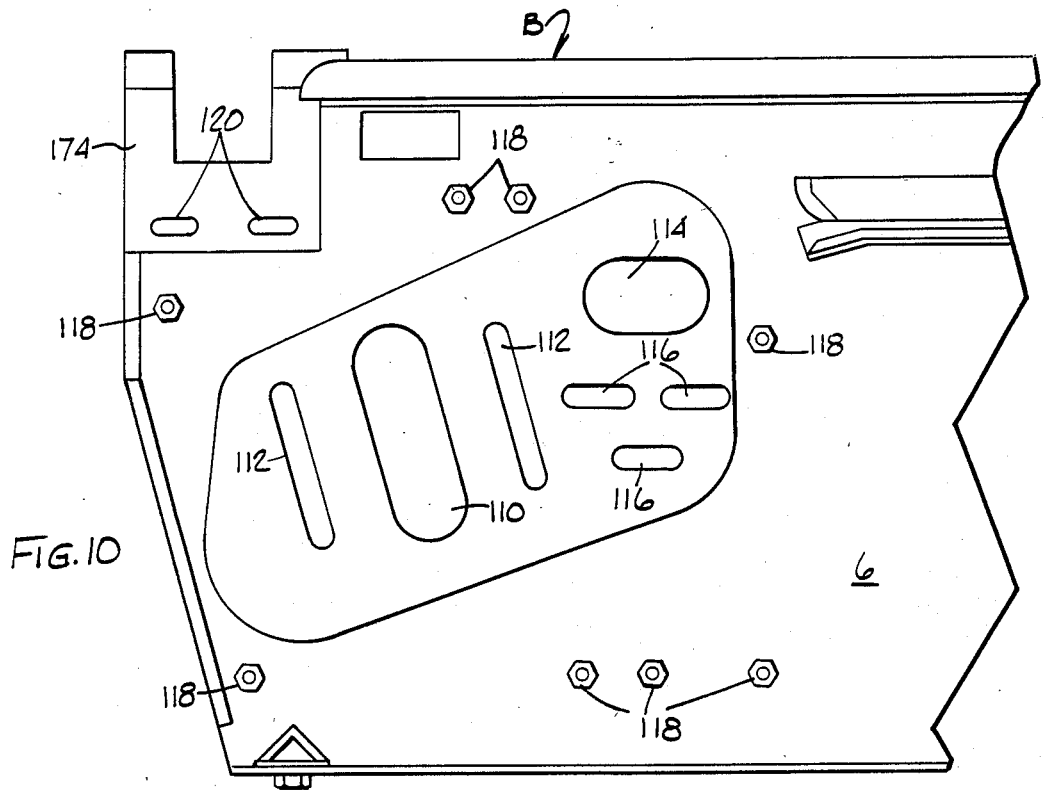
FIG. 10 is a rear elevational view of FIG. 9 illustrating the end portions of the outer side wall.

The mounting of the drive shaft 50 and the snub roll shaft 70 is illustrated in FIGS. 9–16. As illustrated in FIG. 10, the end portion B is provided with a large slot 110 extending in a linear direction at an angle of about 75 degrees to the vertical and is large enough so that the drive shaft 50 may pass therethrough. Two smaller slots 112 are parallel to the large slot 110. Another large slot 114 is formed in the end portion B and extends linearly in a horizontal direction and is large enough so that the snub roll shaft 70 may pass therethrough. Three smaller slots 116 are parallel to the large slot 114. A plurality of threaded nuts 118 are secured to the outer side wall 8 at predetermined locations. Another pair of slots 120 are formed in the outer side wall 10 and extend in the same linear direction.

Figure 15:
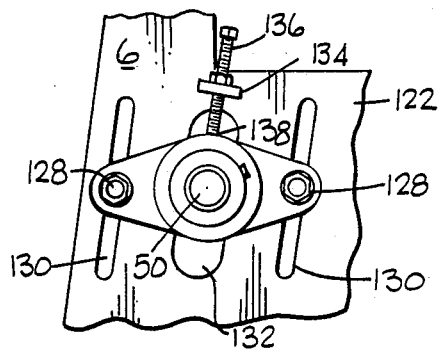
FIG. 15 is a partial side elevational view looking from the line 15—15 of FIG. 14.
Figure 16:
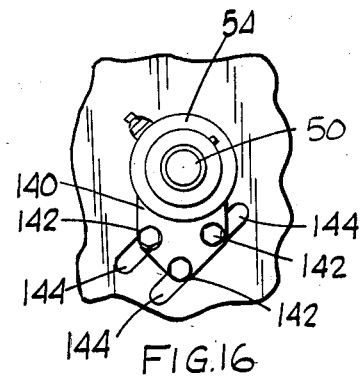
FIG. 16 is a partial side elevational view looking from the line 16—16 of FIG. 14.

As illustrated in FIGS. 9 and 15, a mounting plate 122 is adjustably mounted on the outer side wall 6 by a plurality of threaded bolts 124 passing through slots 126 and threaded into the threaded nuts 118. The outer bearing 52 is adjustably mounted on the mounting plate 122 by threaded bolts and nuts 128 passing through slots 130 in the mounting plate 122 and the slots 112 in the outer side wall 6. The drive shaft 50 passes through a large slot 132 in the mounting plate 122 and the slot 110 in the outer side wall 6. A threaded support 134 is secured to the outer side wall 6 by suitable means, such as by welding, and an adjusting bolt 136 is threaded therein and has an end portion 138 bearing against the outer bearing 52. The inner bearing 54 is similarly mounted, FIG. 16, using a mounting plate 140 secured to the inner side wall 8 and adjustably mounted thereon using threaded bolts and nuts 142 passing through slots 144.

The snub roll shaft 70 is similarly mounted. A mounting plate 150 is adjustably mounted on the outer side wall 6 by a plurality of threaded bolts 152 passing through slots 154 and threaded into the threaded nuts 118. The outer bearing 72 is adjustably mounted on the mounting plate 150 by threaded bolts and nuts 156 passing through slots 158 and the slots 116. The snub roll shaft passes through a large slot (not shown) in the mounting plate 150 and the slot 114 in the outer side wall 6. A threaded support 160 is secured to the outer side wall 6 by suitable means, such as by welding, and an adjusting bolt 162 is threaded therein and has an end portion 164 bearing against the outer bearing 72. The inner bearing 74 is mounted on a mounting plate 164 mounted on the inner side wall 8 and adjustably mounted thereon using threaded bolts and nuts 166 passing through slots 168.

The bearing 34 has a depending portion 172 which is adjustably mounted on a portion 174 of the oute side wall 6 using threaded bolts and nuts 176 passing through the slots 120.

Figure 17:
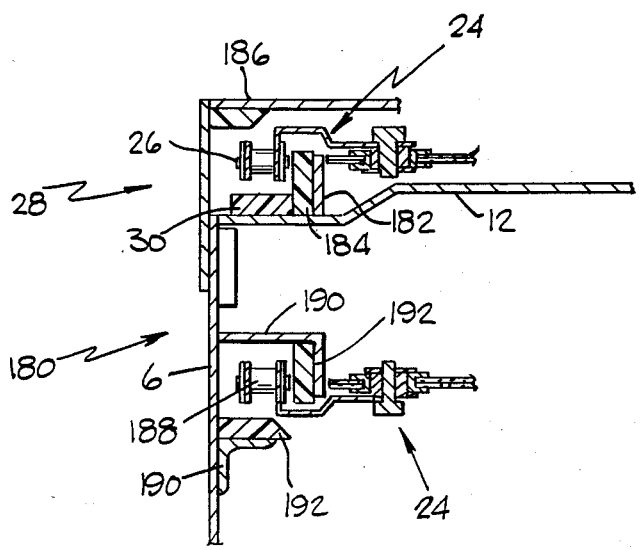
FIG. 17 is a cross-sectional view of the guiding means for guiding the endless link chain.
Figure 18:
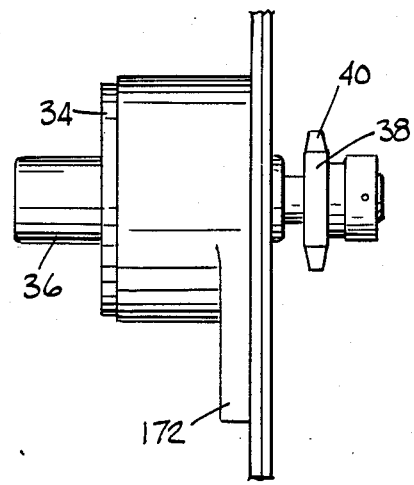
FIG. 18 is an elevational view of the idler sprocket assembly.

In FIG. 17, there is illustrated guide means 180 for guiding the movement of the endless link chain 22. The guide means 180 for the upper run 26 comprises a vertically extending support wall 182 secured to the slide bed 12 and a wear strip 184. The wear strip 30 is secured to a portion of the slider bed 12. A cover 186 for the endless link chain 22 is removably mounted on the outer side wall 6. The guide means 180 for the lower run 188 comprises a pair of support brackets 190 with wear strips 192 secured thereto.

Apparatus in accordance with this invention is designed so that under ideal conditions the drive shaft 50 and the snub roll shaft 70 will be in the center of the slots 110 and 114. Under these conditions, the endless conveyor belt 16 will have a contacting relationship with the peripheral outer surface 58 of the drive roll 56 of at least 140 degrees. Also the endless link chain 22 will have contact with the peripheral outer surface of the sprocket 60 of at least 140 degrees. In one embodiment of the invention, the apparatus was designed for an endless conveyor belt 16 having a width of about 36 inches and the power turn changed the direction of movement 90 degrees. The rotatable rolls 32 have an outer diameter of 0.625 inch and are mounted for rotation about a horizontal axis. The center of drive shaft 50 is located about 8.12 inches from the center of the axis of rotation of the rolls 32 and a line joining these centers extends at an angle of 57 degrees to the horizontal. The axis of the drive shaft 50 extends slightly upwardly from the outer side wall 6 to the inner side wall 8 at an angle of about 7.0 degrees to the horizontal. The drive roll 56 has an axial extent of about 36 inches and the tapered outer surface 58 has a largest diameter of about 5.58 inches and a smallest diameter of about 2.18 inches. The drive sprocket has a diameter of about 5.98 inches and has 30 teeth. The center of the snub roll shaft 70 is located 10.12 inches from the center of the axis of rotation of the rolls 32 and a line joining these centers extends at an angle of 23 degrees to the horizontal. The axis of the snub roll shaft 70 extends slightly upwardly from the outer side wall 6 to the inner side wall 8 at an angle of about 4.0 degrees to the horizontal. The snub roll 76 has an axial extent of about 36 inches and the tapered outer surface 78 has a largest diameter of about 3.14 inches and a smallest diameter of about 1.22 inches. The snub roll sprocket 80 has a diameter of about 3.40 inches and 17 teeth. The idler sprocket 38 has a diameter of about 1.88 inches and 8 teeth. The endless conveyor belt 16 may be driven at speeds of up to about 100 feet per minute and carry load up to about 15 pounds per linear foot at conveyor belt centerline.

In FIG. 2, the angular relationship of the idler sprocket 38, the drive sprocket 60 and the snub roll sprocket 80 from a top plan view is illustrated. Each idler sprocket 38 rotates in a vertical chordal plane 38a of the arcuate outer side wall 6 which is perpendicular to the axis of rotation of the plurality of rolls 32. Each drive sprocket 60 rotates in a vertical chordal plane 60a which is inclined to the vertical chordal plane 38a at an angle of about 4.6 degrees. Each snub roll sprocket 80 rotates in a vertical chordal plane 80a which is inclined to the vertical chordal plane 38a at an angle of about 9.7 degrees. In FIG. 4, the angular relationship of the same sprockets from the end elevational view is illustrated. Each idler sprocket 38 rotates in a vertical plane 38b which is substantially parallel to the outer side wall 6. Each drive sprocket 60 rotates in a vertical plan 60b which is inclined to the vertical plane 38b at an angle of about 7.0 degrees. Each snub roll sprocket 80 rotates in a vertical plane 80b which is inclined to the vertical plane 38b at an angle of about 4.0 degrees and to the vertical plane 60b at an angle of about 3.0 degrees.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for driving an endless conveyor belt for a power turn comprising:

a frame having carved outer and inner side walls;

support means for holding said outer and inner side walls in spaced apart relationship;

a movable endless conveyor belt having outer and inner peripheral edges and wherein said outer peripheral edge has a radius greater than the radius of said inner peripheral edge;

a movable endless chain secured to an outer portion of said endless conveyor belt and extending outwardly therefrom over said outer peripheral edge;

guide means for guiding the movement of said endless chain;

said frame having a first end portion and a second end portion;

a plurality of rolls rotatably mounted on a shaft at each of said end portions and said rolls having cylindrical outer surfaces having a diameter less than about one inch;

each of said plurality of rolls having an axis of rotation which is generally parallel to the horizontal;

a rotatable drive shaft mounted on said outer and inner side walls adjacent to each of said end portions;

drive means for rotating at least one of said drive shafts;

a drive roll mounted on each of said drive shafts for rotation therewith;

each of said drive rolls having a tapered outer surface with the largest diameter thereof closer to said outer side wall;

a drive sprocket mounted on each of said drive shafts for rotation therewith;

each of said drive sprockets having a plurality of teeth projecting outwardly from the peripheral outer surface thereof for engagement with said endless chain;

each of said drive shafts being located below and arcuately inwardly from one of said plurality of rolls;

a snub roll shaft mounted on said frame at locations above and arcuately inwardly from each of said drive shafts;

a snub roll is provided for each of said snub roll shafts for rotation therewith;

each of said snub rolls having a tapered outer surface with the largest diameter thereof closer to said outer side wall;

a sprocket mounted on each of the snub roll shafts for rotation therewith;

each of said sprockets having a plurality of teeth projecting outwardly from the peripheral outer surface thereof and located to be engaged by said endless chain to rotate said snub roll shaft;

an idler sprocket rotatably mounted on said outer side wall adjacent each of said end portions;

each of said idler sprockets having an axis of rotation that is parallel to said axis of rotation of said plurality of rolls;

each of said idler sprockets having a plurality of teeth projecting outwardly from the peripheral outer surface thereof and located to be engaged by said endless chain so as to guide the movement of said movable endless chain;

said movable endless conveyor belt being mounted so that during the movement thereof portions thereof will contact portions of the outer surface of said plurality of rolls; portions of the lower half of said drive rolls and portions of the upper half portion of said snub rolls; and said movable endless chain being mounted so that during the movement thereof portions thereof will contact portions of said idler sprockets; portions of the lower half of said drive sprockets and portions of the upper half of said snub roll sprockets.

2. Apparatus as in claim 1 wherein:

said contact between said movable endless conveyor belt and said lower half of each of said drive rolls extends for an arcuate distance of at least 140 degrees; and said contact between said movable endless chain and said lower half of each of said drive sprockets extends for an arcuate distance of at least 140 degrees.

3. Apparatus as in claim 1 wherein:

each of said plurality of rolls being located relative to the closer of said drive rolls so that a vertical plane tangent to the outer surfaces of said plurality of rolls is in spaced apart and parallel relationship to a vertical plane tangent to the arcuately closer portion of said peripheral outer surface of said closer drive roll; and each of said drive rolls being located relative to the closer of said snub rolls so that a vertical plane tangent to the portion of said outer peripheral surface of said drive roll closer to said closer snub roll is in spaced apart and parallel relationship to a vertical plane tangent to the arcuately closer portion of said outer peripheral surface of said closer snub roll.

4. Apparatus as in claim 1 and further comprising:

adjusting means for adjusting the location of said snub roll shaft along a linear path of movement and extending generally in a horizontal direction to vary the extent of contact between said movable endless conveyor belt and said lower half of said drive roll and the extent of contact between said movable endless link chain and said lower half of said drive sprocket.

5. Apparatus as in claim 4 wherein said adjusting means for said snub roll shaft comprises:

at least two spaced apart slots in said outer side wall and extending in parallel linear directions;

mounting means for mounting said snub roll shaft on said outer side wall;

said mounting means locating said snub roll shaft so that is passes through a first one of said slots for guided movement in said linear path; and guide and locking means on said mounting means and having a portion thereof passing through a second one of said slots for guided movement in said linear path.

6. Apparatus as in claim 4 and further comprising:

adjusting means for adjusting the location of said drive shaft along a linear path of movement extending in a direction slightly inclined to the vertical to vary the extent of contact between said movable endless conveyor belt and said lower half of said drive roll and the extent of contact between said movable endless link chain and said lower half of said drive sprocket.

7. Apparatus as in claim 6 wherein said adjusting means comprises:
at least two spaced apart slots in said outer side wall and extending in parallel linear directions;
mounting means for mounting said drive shaft on said outer side wall;
said mounting means locating said drive shaft so that it passes through a first one of said slots for guided movement in said linear path of movement of said drive shaft; and
guide and locking means on said mounting means and having a portion thereof passing through the second one of said slots for guided movement in said linear path of movement of said drive shaft.

8. Apparatus as in claim 1 wherein:
each of said idler sprockets rotates in a vertical chordal plane which is substantially perpendicular to said axis of rotation of said plurality of rolls;
each of said drive sprockets rotates in a vertical chordal plane which is inclined to said vertical chordal plane of said idler sprocket; and
each of said snub roll sprockets rotates in a vertical chordal plane which is inclined to said vertical chordal plane of said idler sprocket.

9. Apparatus as in claim 8 wherein:
said vertical chordal plane of said drive sprocket is inclined at an angle of about 4.6 degrees to said vertical chordal plane of said idler sprocket; and
said vertical chordal plane of said snub roll sprocket is inclined at an angle of about 9.7 degrees to said vertical chordal plane of said drive sprocket.

10. Apparatus as in claim 8 wherein:
each of said idler sprockets rotates in a vertical plane which is substantially perpendicular to said outer side wall and substantially perpendicular to said axis of rotation of said plurality of rolls;
each of said drive sprockets rotates in a vertical plane which is inclined to said vertical plane of said idler sprocket; and
each of said snub roll sprockets rotates in a vertical plane which is inclined to said vertical plane of said idler sprocket.

11. Apparatus as in claim 10 wherein:
said vertical plane of said drive sprocket is inclined at an angle of about 4.0 degrees to said vertical plane of said idler sprocket; and
said vertical plane of said snub roll sprocket is inclined at an angle of about 7.0 degrees to said vertical plane of said drive sprocket.

12. Apparatus as in claim 1 wherein:
said contact between said movable endless conveyor belt and said lower half of each of said drive rolls extends for an arcuate distance of at least 140 degrees;
said contact between said movable endless chain and said lower half of each of said drive sprockets extends for an arcuate distance of at least 140 degrees;
each of said plurality of rolls being located relative to the closer of said drive rolls so that a vertical plane tangent to the outer surfaces of said plurality of rolls is in spaced apart and parallel relationship to a vertical plane tangent to the arcuately closer portion of said peripheral outer surface of said closer drive roll; and
each of said drive rolls being located relative to the closer of said snub rolls so that a vertical plane tangent to the portion of said outer peripheral surface of said drive roll closer to said closer snub roll is in spaced apart and parallel relationship to a vertical plane tangent to the arcuately closer portion of said outer peripheral surface of said closer snub roll.

13. Apparatus as in claim 12 and further comprising:
first adjusting means for adjusting the location of said snub roll shaft along a linear path of movement and extending generally in a horizontal direction to vary the extent of contact between said movable endless conveyor belt and said lower half of said drive roll and the extent of contact between said movable endless link chain and said lower half of said drive sprocket.

14. Apparatus as in claim 13 wherein said first adjusting means comprises:
at least two spaced apart slots in said outer side wall and extending in parallel linear directions;
mounting means for mounting said snub roll shaft on said outer side wall;
said mounting means locating said snub roll shaft so that is passes through a first one of said slots for guided movement in said linear path; and
guide and locking means on said mounting means and having a portion thereof passing through a second one of said slots for guided movement in said linear path.

15. Apparatus as in claim 14 and further comprising:
second adjusting means for adjusting the location of said drive shaft along a linear path of movement extending in a direction slightly inclined to the vertical to vary the extent of contact between said movable endless conveyor belt and said lower half of said drive roll and the extent of contact between said movable endless link chain and said lower half of said drive sprocket.

16. Apparatus as in claim 15 wherein said second adjusting means comprises:
at least two additional spaced apart slots in said outer side wall and extending in parallel linear directions;
mounting means for mounting said drive shaft on said outer side wall;
said mounting means locating said drive shaft so that it passes through a first one of said slots for guided movement in said linear path of movement of said drive shaft; and
guide and locking means on said mounting means and having a portion thereof passing through the second one of said slots for guided movement in said linear path of movement of said drive shaft.

17. Apparatus as in claim 16 wherein:
each of said idler sprockets rotates in a vertical chordal plane which is substantially perpendicular to said axis of rotation of said plurality of rolls;
each of said drive sprockets rotates in a vertical chordal plane which is inclined to said vertical chordal plane of said idler sprocket; and
each of said snub roll sprockets rotates in a vertical chordal plane which is inclined to said vertical chordal plane of said idler sprocket.

18. Apparatus as in claim 17 wherein:

said vertical chordal plane of said drive sprocket is inclined at an angle of about 4.6 degrees to said vertical chordal plane of said idler sprocket; and said vertical chordal plane of said snub roll sprocket is inclined at an angle of about 9.7 degrees to said vertical chordal plane of said drive sprocket.

19. Apparatus as in claim 18 wherein:

each of said idler sprockets rotates in a vertical plane which is substantially perpendicular to said outer side wall and substantially perpendicular to said axis of rotation of said plurality of rolls;

each of said drive sprockets rotates in a vertical plane which is inclined to said vertical plane of said idler sprocket; and each of said snub roll sprockets rotates in a vertical plane which is inclined to said vertical plane of said idler sprocket.

20. Apparatus as in claim 19 wherein:

said vertical plane of said drive sprocket is inclined at an angle of about 4.0 degrees to said vertical plane of said idler sprocket; and said vertical plane of said snub roll sprocket is inclined at an angle of about 7.0 degrees to said vertical plane of said drive sprocket.

* * * * *